Dec. 15, 1925.
H. H. JONES
SCREW JACK
Filed Jan. 9, 1925  2 Sheets-Sheet 1
1,565,805
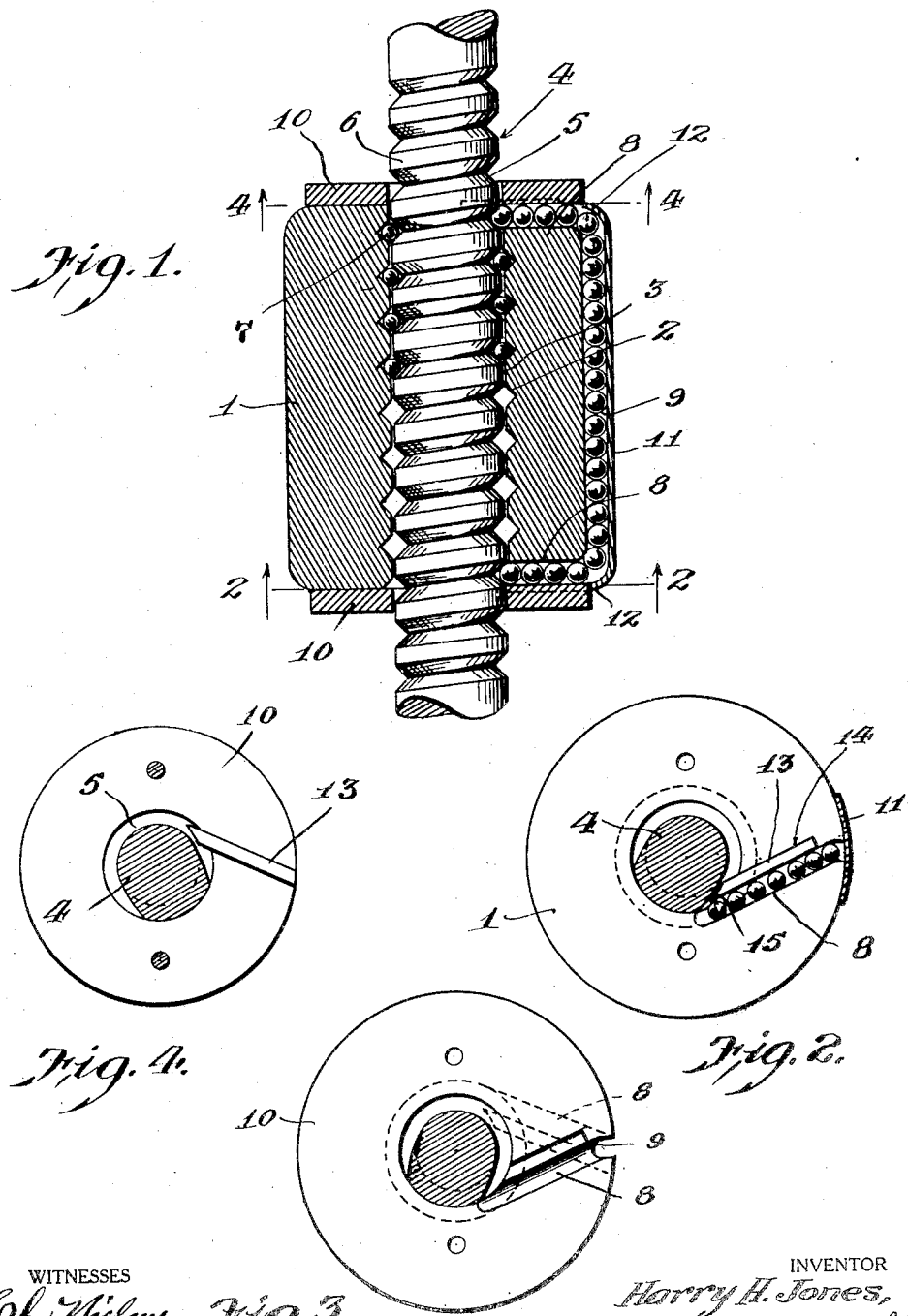

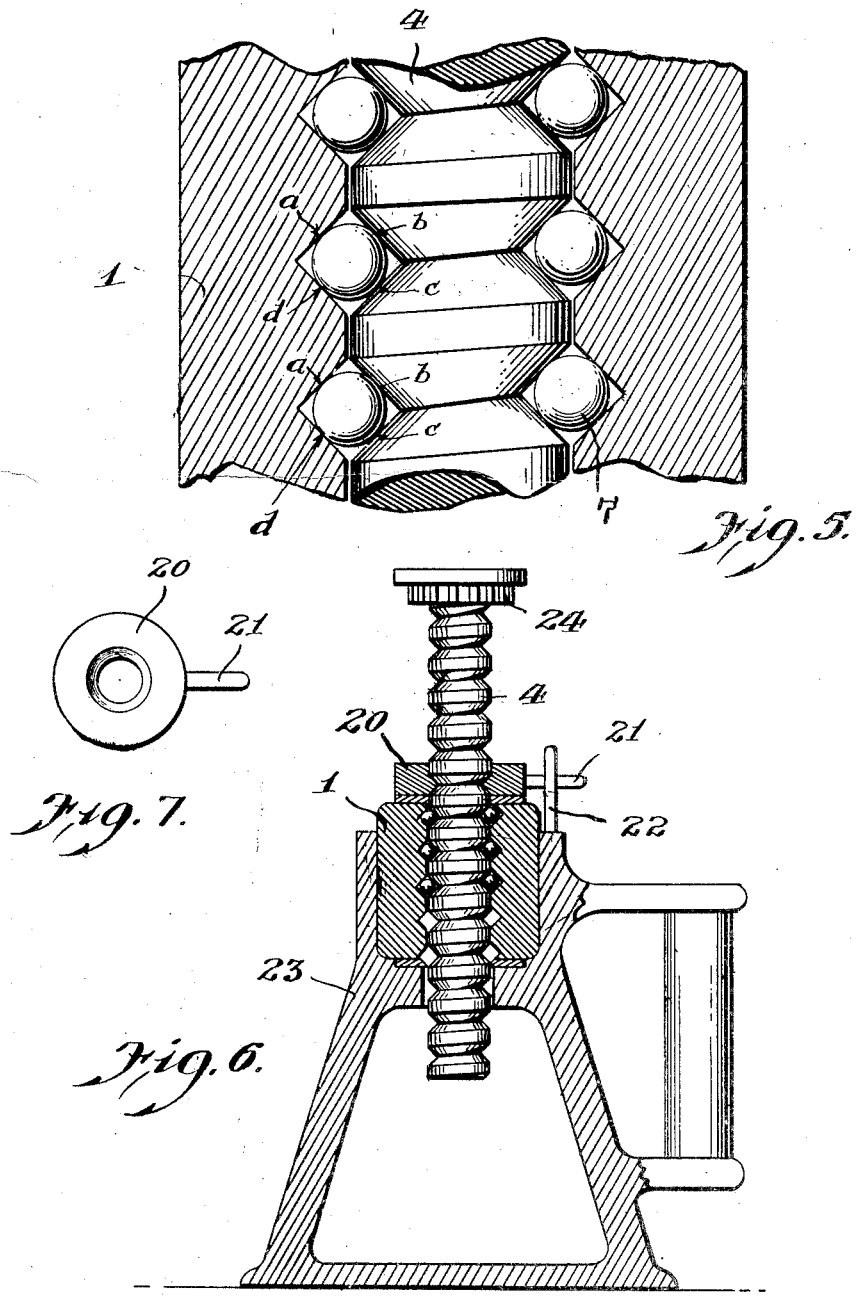

Patented Dec. 15, 1925.

1,565,805

UNITED STATES PATENT OFFICE.

HARRY HERBERT JONES, OF SANTA BARBARA, CALIFORNIA, ASSIGNOR OF ONE-THIRD TO YEE YUEN AND ONE-THIRD TO ERNEST K. SEN, BOTH OF SANTA BARBARA, CALIFORNIA.

SCREW JACK.

Application filed January 9, 1925. Serial No. 1,467.

*To all whom it may concern:*

Be it known that I, HARRY H. JONES, a citizen of the United States, and a resident of Santa Barbara, in the county of Santa Barbara and State of California, have invented certain new and useful Improvements in Screw Jacks, of which the following is a specification.

This invention relates to an improved ball bearing screw jack or the like which is not only susceptible of embodiment in jacks but which also may be used in the construction of hoists, presses, portable elevators, or in similar capacities employing ball bearing screws.

The object of the invention is the provision of a device of this character which is comparatively inexpensive to manufacture, which is of simple and compact, through strong and durable construction, which is not liable to get out of order, which reduces friction to a minimum and which may be made with a smaller lead to develop more power than jacks of this type heretofore proposed.

A further object is the provision of a device having the advantages and capacities mentioned and wherein the screw and nut are so constructed and the balls are so organized with the screw and nut that the load is applied to the substantial structure of the screw and nut and the balls have multipoint bearing contact on the screw and nut, the balls being spaced from and out of engagement with the edges of the spiral recesses of the screw and nut, whereby a rolling contact is maintained between the balls and the screw and nut, and the edges of the recesses of the screw and nut are not subjected to strains liable to crumble or deform the same, these edges in fact being subjected to little or no strain.

A further object resides in the provision of a novel form of brake which is of extremely durable and simple construction though reliable and in part automatic in its operation and effective to retard and stop relative movements of the screw and nut when such is desired, although easily released to permit relative movement of these parts.

Other objects and advantages reside in certain novel features of the construction, arrangement and combination of parts which will be hereinafter more fully set forth and particularly pointed out in the appended claims, reference being had to the accompanying drawings forming a part of this specification, and in which:

Figure 1 is a view partly in section and partly in elevation showing a screw, nut, and ball bearing assembly constructed in accordance with the present invention and adapted for embodiment in a jack or the like;

Figure 2 is a view in section on line 2—2 of Figure 1;

Figure 3 is a similar view on line 3—3 of Figure 1;

Figure 4 is a view on line 4—4 of Figure 1;

Figure 5 is an enlarged view showing how a ball coacts with the recesses of the screw and nut;

Figure 6 is a view partly in elevation and partly in section showing the brake employed; and Figure 7 is a detail view of the nut and handle employed as elements of the brake.

Referring to the drawings wherein for the sake of illustration is shown one embodiment of the invention, the numeral 1 designates a nut which is mounted on a suitable casing or stand (not shown). The nut 1 is provided with a threaded bearing made up of a spiral V-shaped recess 2, the convolutions of which spaced as shown and between the convolutions a flat spiral rib 3 is formed. A screw 4 coacts with the threaded bearing of the nut 1 and has a spiral V-shaped recess 5 in its periphery and as in the case of the nut this spiral V-shaped recess 5 has its convolutions spaced by a flat rib 6. The V-shaped recesses of the nut and screw are complementary in the assembly and provide a portion of a runway for ball bearings 7.

The ends of the nut 1 are formed with grooves 8 and the periphery of the nut is formed with a lengthwise groove 9 which communicates at its ends with the grooves 8. Flat end plates 10 are fastened to the ends of the nut 1 and close the grooves 8. An arcuate side plate 11 which fastens to the periphery of the nut closes the groove 9, the ends of the arcuate plate 11 being inwardly deflected as at 12 to completely close the juncture of the grooves 8 and 9. In this way a return for the balls from one end of the nut to the other is provided and the runway for the balls is completed.

Deflectors are provided for the balls and are designated at 13, the deflectors being disposed in recesses 14 formed contiguous with the grooves 8 and having pointed ends 15 projecting into the V-shaped recesses.

With this arrangement the ball bearings 7 have a multipoint bearing contact on substantial portions of the screw and nut and are spaced from the edges of the recesses of the screw and nut. As shown in Figure 5, each ball has a bearing contact at points $a$, $b$, $c$ and $d$ and with this organization the vertical load imposed on the screw is so resolved that a substantial component of the load is taken at an angle and consequently is applied to the heavy and substantial portions of the nut and screw. The balls do not contact or engage with the edges of the recesses and therefore cannot distort or crush these edges. The balls always have rolling contact with the screw and nut and cannot bind or jam. The construction is compact and simple yet strong, durable and reliable. Friction is reduced to a minimum and it is possible and entirely practicable to make the screw and nut with a smaller lead and consequently to develop more power than jacks of this type heretofore used.

A novel form of stop or brake is organized with the ball bearing screw and is shown to advantage in Figures 6 and 7 of the drawings. This brake or stop comprises a nut 20, having a spiral rib and recess, engaged with the screw 4 and engageable with the top plate 10 of the nut 1. A radially extending handle 21 is fixed to the nut 20 and a spring 22 is carried by the stand 23 and coacts with the handle 21 to so turn the nut 20 as to urge it to engagement with the top plate 10 of the nut. With this arrangement when the screw is being elevated, as by means of an ordinary ratchet arrangement 24, the screw automatically disengages the nut 20 from the top plate 10 and this nut 20 does not retard or interfere with the upward movement of the screw. As soon as the ratchet arrangement 24 is released the spring 22 turns the nut 20 into engagement with the top plate 10 and releasably secures the screw 4 in position. The screw 4 may be released by grasping the handle 21 and turning it to disengage it from the top plate 10 against the action of its spring 21.

I claim:

1. In a jack, a screw and nut having complementary spiral recesses defined by inclined surfaces only, balls operating in the recesses, the inclined surfaces of the recesses being plane and smooth and providing a multipoint bearing contact between the balls and recesses, the edges of the recesses being spaced from the balls and out of contact therewith at all times and in all stages of operation.

2. In a jack, a screw and nut having complementary spiral V-shaped recesses, and balls operating in the recesses, the balls in all stages of the operation and at all times being spaced from the edges of the recess and engaged with the walls thereof.

3. In a jack, a screw and nut having complementary spiral V-shaped recesses, balls operating in the recesses, the balls being spaced from the edges of the recesses and engaged with the walls thereof, the ends and periphery of the nut having grooves coacting with the complementary V-shaped recesses to complete the runway for the balls, plates secured to the nut and covering the grooves to prevent loss of the balls, and deflectors for facilitating the passages of the balls from the recesses to the grooves and from the grooves to the recesses.

4. In a jack, a screw and nut, balls cooperable with the screw and nut, a braking nut operatively engaged with the screw and automatically engageable with the nut to hold the jack in adjusted position and means for releasing the braking nut.

5. In a jack, a screw and nut, balls cooperable with the screw and nut, a braking nut threadedly engaged with the screw and engageable with the nut, spring means for urging the braking nut into engagement with the nut and a handle for releasing the braking nut.

HARRY HERBERT JONES.